Dec. 20, 1960     I. D. PRESS     2,964,796
PREFORMED FLEXIBLE HOSE AND METHOD OF MAKING IT
Filed Dec. 15, 1955
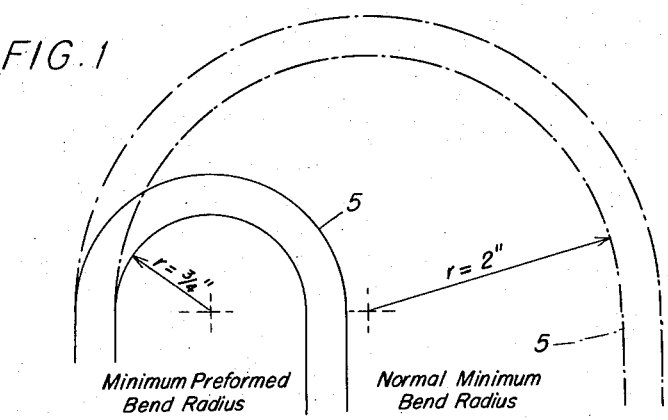
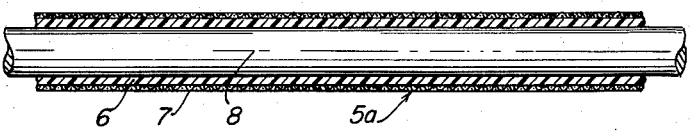
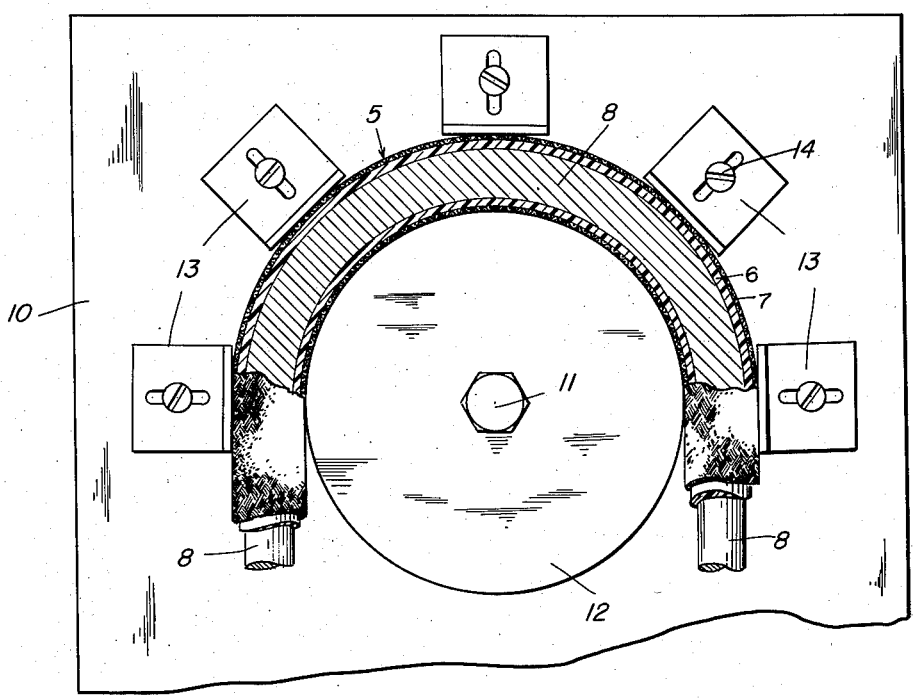
INVENTOR.
Irving D. Press

United States Patent Office 2,964,796
Patented Dec. 20, 1960

2,964,796

PREFORMED FLEXIBLE HOSE AND METHOD OF MAKING IT

Irving D. Press, West Orange, N.J., assignor to Resistoflex Corporation, Belleville, N.J., a corporation of New York Filed Dec. 15, 1955, Ser. No. 553,335

7 Claims. (Cl. 18—56)

This invention relates to flexible hose lines, more particularly hose lines having a polytetrafluoroethylene (hereinafter abbreviated, P.T.F.E.) tube and tighter bends than have heretofore been possible.

There are numerous applications in which flexible hose lines are used by preference in order to avoid vibration failure and difficult installation problems which are encountered in the use of rigid metal tubing. The types of installation under discussion are found in numerous kinds of apparatus but in particular in the "plumbing" of jet engines and other types of aircraft power plants. There is a great quantity of tubing, for example, on a jet engine for conveying fuel and oil, and the space requirements are such that in many places very tight bends of the tubing or hose must be made, that is, bends with a relatively short radius, including various complex bends.

The use of flexible hose lines on jet engines and for other applications wherein they are subjected to high temperature conditions heretofore requiring the use of metal tubing has recently become feasible, it should be noted, by the development of hose having a tube of P.T.F.E., which material is capable of use under operating temperatures up to about 500° F. P.T.F.E. is more generally known by the trademark "Teflon" of its present supplier.

Flexible hose lines, however, have been limited to certain specific minimum bend radii as bends beyond the minimum for any particular hose size result in its collapse. P.T.F.E. tubing is not as flexible as rubber and its relative rigidity gives it a large minimum bend radius. Because of this situation designers have heretofore continued to use bent rigid metal tubing, well knowing that it may have a short life due to vibration failure and that installation of the bent metal tubing sections may present serious production problems due to the necessity of much custom fitting of each rigid assembly and an attendant stressing to an unknown degree of hard-to-fit or inaccurately fitted parts.

The present invention meets these problems, enabling flexible hose lines of the type described to be used in locations where a rigid bent metal pipe has heretofore been considered necessary, by the use of what is termed herein "preformed" flexible hose. By the preforming process of the invention it is possible to bend the hose on a much shorter bend radius. The hose so bent may be permanently set to the shape it will have in the installation for which it is intended. Hence it is more easily installed.

The hose which is preformed in accordance with the invention is one which has a tube or liner of polytetrafluoroethylene. This tube may have an outer reinforcing covering of any desired flexible construction, which covering usually consists of one or more tubular layers of wire braided closely around the P.T.F.E. tube. Such hose is, of course, made into hose assemblies by the attachment of fittings to the ends of sections of hose of the desired length.

Preforming of such hose in accordance with the invention is carried out in the following general manner: A section of hose of approximately the desired length, is filled with a suitable flexible mandrel or pressure medium such as gas or liquid, bent while cold, heated while held in the desired bent shape, cooled and then, if a mandrel has been used, stripped off of the mandrel. As will be apparent, the process is equally applicable to the shaping of naked P.T.F.E. tubing wherever the use of such tubing with sharp bends is desirable.

The invention will be better understood from the following detailed description read in conjunction with the drawings in which:

Fig. 1 illustrates diagrammatically in solid lines, for a particular size of Teflon hose having a cover consisting of a single layer of wire braid, the minimum preformed bend radius and in broken lines the normal minimum bend radius of the same hose;

Fig. 2 is a fragmentary central longitudinal section through a piece of similar hose of somewhat larger size with a flexible mandrel inserted therein; and Fig. 3 is a plan view of one form of restraining means for holding the shaped hose while it is subjected to heat treatment.

In Fig. 1 the original drawings show to scale in broken lines the normal minimum bend radius of a hose 5 of "–4" size in accordance with the table hereinafter set forth. This size hose, if bent to a shorter radius, will kink the tube and restrict the flow through it. In solid lines Fig. 1 shows the minimum bend radius which may be obtained with the same hose by preforming in accordance with the invention.

The first step in the process is to cut the hose to the approximate length desired, allowing a slight excess. Into this hose any suitable flexible mandrel is inserted. The only requirements for the mandrel are that it shall be sufficiently flexible, shall have a sufficient body to prevent the collapse of the tube when bent, and shall be able to withstand the temperature of the subsequent heat treatment. Suitable materials which have been used as mandrels include solid rod or tubing P.T.F.E., silicone rubber and synthetic rubber such as neoprene. Hose of such materials are flexible steel shafting may likewise be used.

In Fig. 2 the hose 5a is shown as having a P.T.F.E. tube 6 and a single wire braid cover 7 (schematically represented), inside which is a flexible solid mandrel 8. The mandrel should be of such size relative to the hose as to have an easy slip fit therein, as large as can be used without making removal difficult after bending.

The next step is to bend the tubing or hose containing the mandrel into the desired shape, holding that shape by means of any suitable fixture or jig. One form of fixture is shown in Fig. 3 and consists of a flat plate 10 to which is attached by a bolt 11 a cylindrical block 12 around which are a number of adjustable clamps or stops 13 held by screws 14. If the block 12 and the faces of clamps 13 extend upwardly from plate 10 for a sufficient distance, a number of sections of bent tubing or hose may be simultaneously held in the fixture. The bend shown is 180° but by eliminating one or more of the clamps, any lesser bend may be formed and by the use of other clamps or stops one may form compound bends.

After the tubing or hose is mounted as above described it, together with the fixture, is heated in an oven to the desired temperature and allowed to remain therein until the tubing or hose has become uniformly heated throughout. The temperature is preferably of the order of about 450° F. P.T.F.E. becomes a gel above 620° F. and it should be heated short of this temperature. It may be formed at temperatures much lower than 400° F. but the heat treatment then requires a longer time. Optimum results are obtained by heating for about ½ hour at 450°.

The next step is to cool the tubing or hose down to room temperature while still retained in the desired shape, after which it is removed from the fixture, the mandrel withdrawn, its ends trimmed, and fittings applied thereto if desired. There is thus produced a preformed tube or hose assembly having the exact shape desired in use but still having flexibility.

One factor determining the temperature to be used in the heat treatment is that P.T.F.E. tubing which has been formed to a particular shape in the manner described will not retain that shape if it is heated to a temperature above that at which it was formed. Due to its "plastic memory," it tends to return to its initial shape if raised to a higher temperature. If it is known that a hose assembly is to be used, for example, under conditions where it will be heated to a temperature of 400°, it should be preformed at a somewhat higher temperature, for example 450°.

The following table shows the great difference between the normal minimum bend radius of hose of the type above described, having a P.T.F.E. tube and a single layer cover of stainless steel wire braid, and the sharper bends which may be made in the same hose in accordance with the invention:

| Tube Size (Dash No.) | Flexible Hose | | Min. Bend Radius¹ Inches | Min. Preform Radius¹ Inches |
|---|---|---|---|---|
| | I.D. | O.D. | | |
| -4 | ³⁄₁₆ | ⁵⁄₁₆ | 2 | ¾ |
| -5 | ¼ | ⅜ | 3 | 1 |
| -6 | ⁵⁄₁₆ | ⁷⁄₁₆ | 4 | 1¼ |
| -8 | ¹³⁄₃₂ | ⁹⁄₁₆ | 4⅝ | 1½ |
| -10 | ½ | 2¹⁄₃₂ | 5½ | 1¾ |
| -12 | ⅝ | 2⁵⁄₃₂ | 6½ | 2 |
| -16 | ⅞ | 1½₃₂ | 7⅜ | 3 |
| -20 | 1⅛ | 1¹¹⁄₃₂ | 9 | 5 |

¹ All bend radii are measured to the surface of bent hose on the inside of the bend not to its center line.

There is no degradation whatever or any change in the characteristics of P.T.F.E. in performing it as above described and it may, if desired, be reshaped any number of times. One advantage of the process is that in making experimental assemblies or "mock-ups" a completed hose assembly having bends sharper than the normal minimum bend radius of the hose may be formed by filling it with a mandrel, attaching it by means of its end fittings in the place where it is to be used, restraining it in its bent position by any suitable means, and then removing while still under such restraint and subjecting it to heating and cooling as above described. Upon the removal of the mandrel, one has a complete preformed assembly and many hours of drafting time have been saved which otherwise would have been required. The preformed assembly thus produced may thereafter be used as a model from which duplicate assemblies may be produced merely by building a forming fixture around it.

While the use of a mandrel as above described has been found preferable for most bending and forming operations, in the case of very complex bends where removal of a mandrel might present a problem one may prevent kinking or collapse of the tube or hose during forming by equipping it with end fittings, either temporary or permanent, and filling it with a pressure fluid. Compressed air and other gases have been used, a pressure relief valve being connected to the tube to release pressure during the heating step to prevent the development of excessive pressure which would otherwise result from the expansion of the gas. Similarly, a suitable incompressible liquid may be used, preferably one having a boiling point above the temperature used in the heating step. There are several suitable high-boiling point oils.

The foregoing detailed description is merely by way of illustrating the invention and many details may be changed without departing from the invention as defined in the claims.

What is claimed is:

1. The method of forming from a length of flexible tubing having a polytetrafluoroethylene tube, which tubing normally has a given minimum radius about which it can be bent, a bent section having a bend radius substantially less than said given minimum, comprising the steps of inserting a flexible mandrel in said tubing to substantially fill it, then forming the tubing at room temperature to the shape desired for the bent section, heating the tubing while maintaining said shape to a temperature below the gel point of the polytetrafluoroethylene for a time sufficient to cause said shape to be retained upon cooling, then cooling the tubing while still maintaining it in said shape, and thereafter removing said mandrel.

2. The method according to claim 1, wherein a flexible mandrel is employed which makes a slip fit with the tubing and the temperature to which the tubing is heated lies between 400° F. and 600° F.

3. The method according to claim 2, wherein the temperature to which the tubing is heated is substantially below 620° F.

4. The method of forming from a length of flexible tubing having a polytetrafluoroethylene tube, which tubing normally has a given minimum radius about which it can be bent, a bent section having a bend radius substantially less than said given minimum, comprising the steps of filling the tubing with a substance for exerting pressure against the inner wall of the tubing during bending sufficient to prevent its collapse, then forming the tubing while cold to the shape desired for the bent section, heating the tubing while maintaining said shape to a temperature below the gel point of the polytetrafluoroethylene for a time sufficient to cause said shape to be retained upon cooling, then cooling the tubing while still maintaining it in said shape, and thereafter removing said substance.

5. The method of forming a bent section of polytetrafluoroethylene tubing which comprises, inserting a flexible mandrel in said tubing to substantially fill it, then forming the tubing while cold to the shape desired for the bent section, then heating the tubing while maintaining said shape to a temperature substantially below 620° F. for a time sufficient to cause said shape to be retained upon cooling, cooling the tubing while still maintaining it in said shape, and thereafter removing said mandrel.

6. The method of fixing a bend in a polytetrafluoroethylene body which comprises forming the body while cold to the shape desired for the bend, heating said body while restrained in the shape of said bend to a temperature above that to which it will be subjected in use and substantially below 620° F. for a time sufficient to cause the bend to be retained upon cooling, and cooling the body while still restraining it in the shape of said bend.

7. The method of permanently fixing a bend in a flexible polytetrafluoroethylene tube which comprises bending the tube to the shape desired while cold, heating the tube while restrained in said shape to a temperature of from 400° to about 450° F. for about one-half hour, and then cooling the tube while still restrained in its bent shape.

(References on following page)

References Cited in the file of this patent

UNITED STATES PATENTS

| | | |
|---|---|---|
| 1,602,165 | Parker | Oct. 5, 1926 |
| 2,389,038 | German | Nov. 13, 1945 |
| 2,392,842 | Doell | Jan. 15, 1946 |
| 2,449,265 | Williams | Sept. 14, 1948 |
| 2,602,962 | Deakin | July 15, 1952 |
| 2,728,356 | Brinsmade et al. | Dec. 27, 1955 |
| 2,787,289 | Press | Apr. 2, 1957 |

FOREIGN PATENTS

| | | |
|---|---|---|
| 7,025 | Great Britain | Apr. 5, 1893 |

OTHER REFERENCES

Publication: British Plastics, August 1949, pages 457–464.

Publication: Modern Plastics, December 1952, pages 79–87, (Copy in Div. 11.)

Publication: Plastic, July 1946, pp. 32, 34, 97.

UNITED STATES PATENT OFFICE
CERTIFICATE OF CORRECTION

Patent No. 2,964,796                                        December 20, 1960

Irving D. Press

It is hereby certified that error appears in the above numbered patent requiring correction and that the said Letters Patent should read as corrected below.

Column 2, line 18, for "Teflon" read -- P.T.F.E. --; line 46, for "are" read -- and --; column 3, line 48, for "performing" read -- preforming --; column 4, line 30, for the claim reference numeral "2" read -- 4 --; line 46, for "ma ntaining" read -- maintaining --.

Signed and sealed this 19th day of September 1961.

(SEAL)
Attest:

ERNEST W. SWIDER                                  DAVID L. LADD
Attesting Officer                                    Commissioner of Patents

USCOMM-DC